United States Patent [19]

Jemal

[11] 3,910,767

[45] Oct. 7, 1975

[54] APPARATUS FOR PREPARING METALLIC COMPOUNDS BY SUBLIMATION

[76] Inventor: Emile Joseph Jemal, 67 Davenport Road, Yonkers, N.Y. 10522

[22] Filed: Aug. 10, 1973

[21] Appl. No.: 387,308

Related U.S. Application Data

[63] Continuation-in-part of Ser. No. 269,064, July 5, 1972, Pat. No. 3,848,050.

[52] U.S. Cl. ................. 23/264; 23/277 R; 110/13; 266/20
[51] Int. Cl. .................... B01d 7/00; B01j 17/32
[58] Field of Search .... 23/264, 294, 313 FB, 277 R; 110/13, 36; 266/20, 21

[56] References Cited
UNITED STATES PATENTS

| | | | |
|---|---|---|---|
| 490,826 | 1/1893 | Kitson | 110/36 |
| 1,644,518 | 10/1927 | Field | 23/264 |
| 2,721,227 | 10/1955 | Mungen | 23/277 R X |
| 2,958,587 | 11/1960 | Grimes | 23/264 |
| 3,012,862 | 12/1961 | Bertrand et al. | 23/277 R X |
| 3,139,326 | 6/1964 | Costello | 23/264 X |
| 3,204,941 | 9/1965 | Fraser | 110/36 X |
| 3,252,823 | 5/1966 | Jacobson et al. | 423/495 X |

*Primary Examiner*—Morris O. Wolk
*Assistant Examiner*—Arnold Turk

[57] ABSTRACT

Reactor for the preparation of very pure metallic compounds such as $MoO_3$ by sublimation employing the so-called "candle effect," that is, the subdivided $MoS_2$ concentrates are fed to the reactor's sublimation vessel (a rather shallow saucerlike container) after being preferably preheated to about 600°F. A stream of oxidizing gas, also preferably preheated to 400°F, is impinged on the concentrates and at the reaction temperature of 1600°–1700°F it causes pure $MoO_3$ and $SO_2$ to rise, while the impurities fall off the vessel for removal. The vapors are condensed by a stream of liquified $SO_2$ and conveyed to a collector. The process is continuous. Screw feeders move the feed to the vessel. The reactor which is of quartz or the like is contained within a heat-resistant insulating jacket and consists of a substantially straight lower portion and a goosenecked condensing region which has sealed therein the liquified $SO_2$ conduit.

11 Claims, 5 Drawing Figures

3,910,767

APPARATUS FOR PREPARING METALLIC COMPOUNDS BY SUBLIMATION

This application is a continuation-in-part of application Ser. No. 269,064 filed on July 5, 1972 and now U.S. Pat. No. 3,848,050 by the same applicant and incorporated herein for reference.

FIELD OF THE INVENTION

This invention relates to an apparatus for producing highly pure metallic compounds by sublimation. More particularly, the invention is directed to apparatus for the preparation of highly pure molybdenum trioxide by sublimations of molybdenumbearing ore concentrates, especially those containing a high percentage of molybdenum disulphide.

DESCRIPTION OF THE PRIOR ART

Although the process is applicable to other materials, the invention will be described solely with reference to the preparation of molybdenum trioxide.

Molybdenum is a very versatile and important element which has many laboratory and industrial applications. Some of these require molybdenum or molybdenum salts of a high degree of purity. Molybdenum trioxide is particularly valuable in that it can be readily reduced to metallic molybdenum.

The most common source of molybdenum is molybdenite, which may be concentrated by flotation processes to obtain a crude material containing molybdenum disulphide. However, this crude material contains numerous impurities such as iron oxides and sulphides, silica, sodium and potassium salts, oils from the flotation process and other elements such as arsenic, bismuth, antimony, phosphorus and copper in various forms. In the conventional roasting processes which are employed to convert the sulphide into the oxide, gases such as sulphur dioxide and sulphur trioxide are given off and small amounts of sulphuric acid are formed. These add to the difficulties encountered in obtaining pure molybdenum trioxide.

Furthermore, the problem of air pollution is not solved by these roasting processes. Much of the pollution may be traced to these conversion processes which allow enormous quantities of sulphur dioxide, sulphuric acid, sulphur trioxide, arsenic, and other contaminants to leave the roaster and be vented through the surrounding atmosphere. Typical of these processes, which are endowed with such environmental disadvantages, are fully described, for example, in U.S. Pat. No. 2958587 to George R. Grimes and in U.S. Pat. No. 2958588 to Jack M. Noy et al.

Molybdenum trioxide has recently been prepared by further improved processes which involve the steps of roasting molybdenite concentrates to obtain crude molybdenum trioxide which is sublimed and collected in bag filters. These roasting processes have been carried out in various types of equipment such as Herreshoff furnaces, rotating cylinders and doughnut-shaped hearths, while a stream of hot air is passed over a bed of the crude material to sweep away the molybednum trioxide which is formed and sublimed.

Molybdenum trioxide begins to effectively sublime near its melting point. This places severe restrictions on the conditions that may be used in some of the prior art processes. If the temperature is too low, that is, in the range of about 1100°–1300°F, the sublimation will be incomplete, and if too high, that is, in the range of about 1300°–1500°F, the material will melt in the apparatus. As a result, much of the molybdenum trioxide is left behind in the roasted residue which must be given additional treatment if this valuable material is to be fully recovered. In any event, the yields of these prior art processes are notoriously low.

In addition, sulphur dioxide and trioxide gases are formed during the roasting process and these are highly corrosive to the apparatus. At lower temperatures the sulphur trioxide combines with water vapor to form sulphuric acid which tends to be absorbed upon the molybdenum trioxide which is condensed and collected by the bag filters. Even if the purity of the product is improved, the pollution problem has not been solved by such processes.

An even more advanced process is described in U.S. Pat. No. 3139326 to Walter H. Costello, which process may be used to obtain molybdenum trioxide of high purity, in high yields and at low cost from readily obtainable, but impure, molybdenum concentrates. This process combines the separate roasting and sublimation steps of the prior art processes into a single flash oxidation - sublimation step. However, the apparatus of this patent is not free from plugging problems, nor from entrainment of impurities. It uses an excess of air to cool off the reaction, which in turn causes an excessive dilution of the sulphur oxides and the resultant pollution of the surrounding atmosphere. Thus, not only from certain operational reasons, but also from a health-hazard viewpoint, this process is not the proper solution to the problem of molybdenum trioxide recovery without venting of noxious by-products.

BRIEF SUMMARY OF THE INVENTION

The above disadvantages of the prior art processes, both operational and environmental, are overcome by the present invention which exploits a number of physical axioms heretofore gone unheeded.

The process of the present invention employs the commonly known "candle effect", by which an extremely low dust content in the sublimed vapors of molybdenum trioxide is collected, only molybdenum trioxide and sulphur dioxide being removed from the reactor zone and collected. A candle effect sublimation is a method of buring material wherein the material is not suspended in air or fluidized, but passes directly into the vapor state from surface burning leaving all non-sublimable impurities behind.

The principle for operating the apparatus of the invention may be described briefly as follows: the reactant oxidizing agent and the molybdenite concentrates in comminuted form are introduced through separate inlets into one or more reactors. The feed is continuously introduced either by means of a screw feeder through a conduit which terminates into a cup-shaped, plate-shaped or platform vessel, or is deposited by means of a direct inlet conduit on the platform or cup-shaped or plate-shaped vessel. The material, in this illustrative example molybdenum concentrates, is introduced at a temperature, for example, of between 600°–700°F. The combustion agent, such as oxygen, for example, is introduced through a separate but preferably parallel conduit at a temperature varying between ambient and 400°F or over and comes into contact with the molybdenite particles in the region of the concentrate-supporting vessel. The bottom of the furnace or reactor is sealed, for example, by means of zircon sand or the like. The walls of the reactor (or reactors) in the reacting zone are heated by, for example, electric heating elements and are maintained at the sublimation temperature preferably between 1600°–1700°F or higher. Furthermore, the reaction tube is insulated properly from the surrounding atmosphere in order to minimize heat losses, the insulating material being brick of silicon carbide or other equivalent material well known in the art. As the molybdenite particles come into contact with the oxidizing agent, sublimation takes place and only the vapors of molybdenum trioxide and sulphur dioxide rise to the upper portion of the reaction tube. All other impurities and material components of the molybdenite feed, which do not sublime at the operating temperature, fall out of the concentrates-supporting vessel and onto the sealing bed of the reactor mostly as ash and are removed from the reactor as need be. In the case of a platform vessel they are mechanically pushed by means of conventional rabbles toward a predetermined discharge port. Removal of the ashy components may be carried out in accordance with known techniques. One envisaged method, however, comprises the continuous withdrawal by means of an eccentric mechanism which, while maintaining a constant level of sealing material, prevents heat losses and the escape of gaseous compounds from the bottom of the reactor. Another method suitable for a battery of reactors comprises the successive shutting down of a reactor and the lowering of its sealed bottom for the removal of the ashy material residue.

The vapors of molybdenum trioxide and sulphur dioxide, upon leaving the top of the reactor are cooled by a stream of liquid sulphur dioxide and condensed. In a variance of the present invention, it is possible to substitute the liquified sulphur dioxide coolant with a bed of molybdenum pellets, through which the rising vapors pass and are forced to cool. From the reactor the $SO_2$-condensed vapors are introduced into conventional collection and recovery units.

The apparatus of the present invention may, generally, be employed in any recovery process where the product to be recovered is one which sublimes. It will be necessary only to change such parameters as feed/reactant ratio, type of reactant and temperature of reaction. For example it is possible to employ the candle effect of the present process and the apparatus of the present invention in recovering wurtzite, zincite, tellurite, sylvite, lawrencite, greenockite and other sublimable ore materials.

THE DRAWINGS

In order that the invention might be more clearly understood, reference is made to the accompanying drawings, in which.

DETAILED DESCRIPTION OF THE INVENTION

Figure 1:
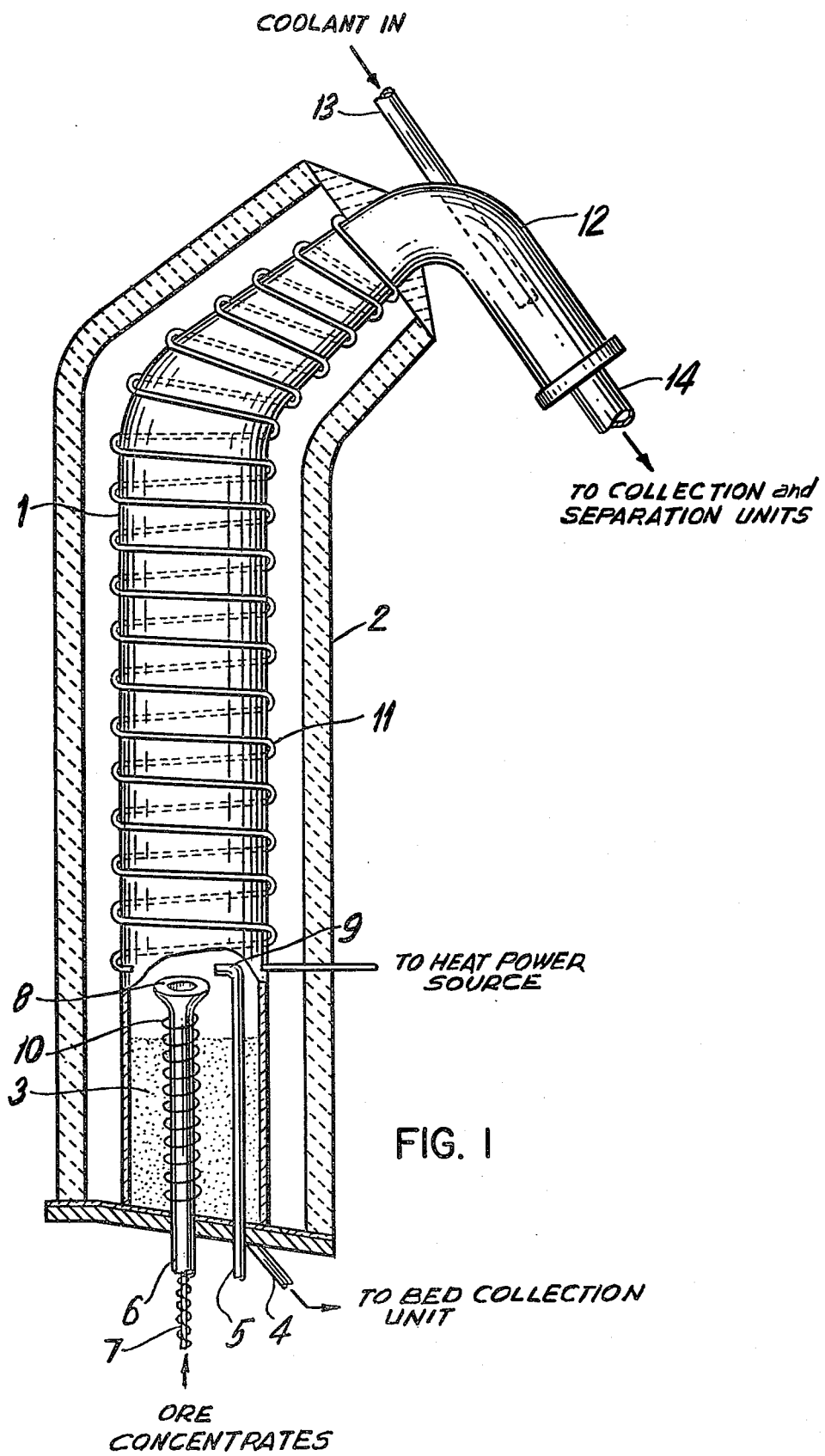
FIG. 1 is a perspective, elevational view, partly in cross-section, of a single reactor or furnace such as may be used in practicing the present invention.

Referring now to FIG. 1 of the drawings, the apparatus of the invention consists of a reactor 1, made preferably of such material as quartz or equivalent, which has a lower, preferably cylindrical portion and an upper substantially goosenecked region. Surrounding the reactor 1 and somewhat spaced therefrom, there is a suitable thickness of insulation 2 for the purpose of maintaining the reactor's temperature uniform throughout and to minimize heat losses. The bottom 3 of the reactor tube is sealed with a bed of such material as, for example, zircon sand, the seal being continuously self-renovating by the falling onto the bed of non-sublimable ashy, residual components of the feed. The ash-like components of the sealing bed are removed, for example, by means of an eccentric and withdrawn from outlet 4, as illustratively shown. Other removal techniques are, however, suitable to the process as explained hereafter. Through the bottom of the reactor there is provided an inlet conduit 5 for the introduction at temperatures of from ambient to 400°F or higher of the combustion gas, suitably oxygen. The bottom of the reactor is also provided with a second inlet conduit 6 for the introduction of the molybdenite feed. The feed is introduced through inlet conduit 6 by means of a screw feeder 7, which carries the feed upwardly in a higher subdivided condition. Typical particle sizes for the molybdenite feed averages less than 20 mesh (U.S. standard sieve). The feed inlet conduit 6 terminates in a cup-shaped or plate-shaped vessel 8 in the vicinity of the terminal 9 of the combustion gas conduit 5. In this manner the conveyed material comes into direct contact with the combustion gas and sublimes. The feed may be, and preferably is, preheated to 600°–700°F by having the feed conduit 6 surrounded by heating element 10 in the area within the reaction tube and especially in the area adjacent the vessel 8. In the region of the reactor 1 from the cup-shaped vessel upward there are provided therearound electric heating elements 11 to maintain the reaction temperature throughout the vaporization zone at the preferred temperatures of 1600°–1700°F or higher. The goosenecked region 12 of the reactor is not heated but cooled. The cooling is caused by a conduit 13 hermetically sealed to the region 12 through which a suitable liquid coolant is introduced. The preferred coolant in the case of $MoS_2$ concentrates is liquified sulphur dioxide. The condensed sublimate vapors and the vapors of sulphur dioxide exit via outlet 14 and are separately recovered in appropriate recovery units (not shown) of conventional construction in a manner well known to the person skilled in the art.

From the above description it is quite clear that the only materials which leave the reactor are the sublimate and sulphur dioxide, all other materials, not vaporizable under the operating conditions, falling to the bottom of the reactor tube from whence they are removed continuously as explained hereabove, in order to allow the process to be a continuous one.

Figure 2:
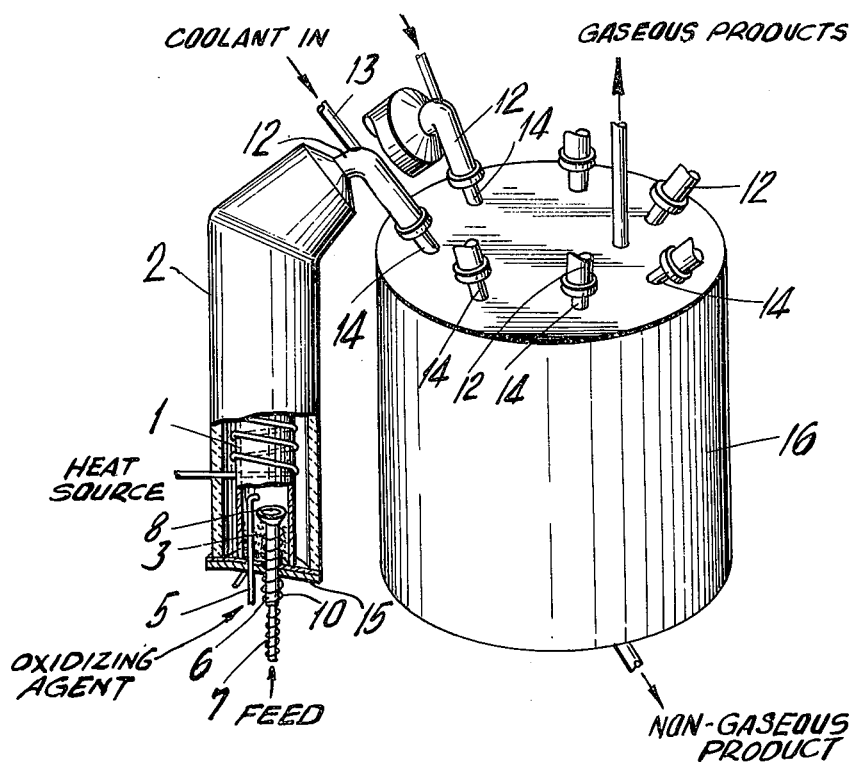
FIG. 2 shows in perspective and schematically a battery of reactors.

Turning now to FIG. 2, a battery of reactors 1 is schematically shown, distributed circumferentially in the mode of satellites around a central collecting unit 16. Same reference characters identify the same elements as in FIG. 1. The reactors are stationary and may suitably comprise one more unit than the number required for a given operation. For example, it is estimated that, employing reactors having an average 2-foot diameter, six reactors may process on a continuous operating basis about one million pounds of concentrates a year. Thus, seven reactors are positioned around the collecting unit 16, so as to enable the intermittent shutting down and cleaning out of successive reactors at the reasonable rate of one reactor every 15–20 days. The gaseous by-products and the condensed products may be removed from the collector 16 as shown. The arrangement illustrated affords the additional advantage of operating economically on a reduced scale by simply shutting down two or more reactors. Also the ease of eventual repairs is greatly enhanced. It is obvious that the temporary removal of a reactor from the operating stream is accomplished by closing the respective inlets to the feed and to the oxidizing agent and the connections to the coolant inlet, the heat source and the discharge 12. All of these operations are accomplished by means of valves, not shown in the drawing in view of their obviousness.

Figure 3:
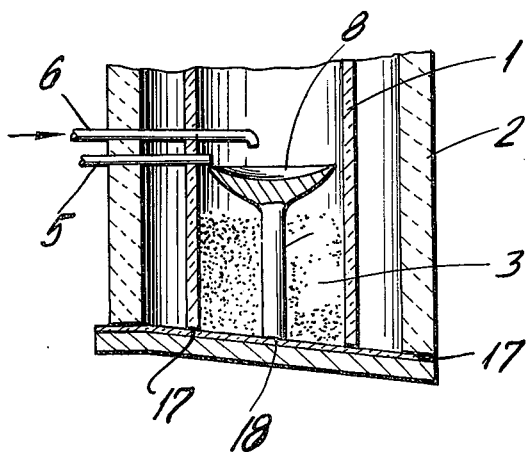
FIG. 3 shows a variance in the feeding of the concentrates and oxidizing agent.

To facilitate the operation of removing the ashy material collected at the bottom of the individual reactors and to clean the reactors prior to reintroducing them in operation, the arrangement illustrated in FIG. 3 is quite suitable. In this case, the concentrates feed is introduced not from the bottom by means of a vertical screw feeder, but horizontally at a point adjacent the surface of the plate-shaped or cup-shaped vessel. The feed may be either force-fed by means of a screw feeder or it may be gravity-fed by providing the inlet with an inclined section (not shown). Similarly, the inlet for the oxidizing agent is positioned adjacent the concentrates feed inlet in order to ensure the sublimation effect in a manner similar to that described with regards to FIG. 1.

The above described positioning of these two inlets facilitates the removal of the ashy material from the reactor, in that the bottom thereof may be formed of a simple plate sealed by conventional means at 17 to the insulating casing 2 and to the reactor's walls, which plate may be simply lowered and the ashy material removed. The cup-shaped vessel may be suitably welded to the bottom plate at 18 and the stem supporting the vessel need not be hollow and serve as concentrates delivery duct. The lowering of the bottom plate and of the vessel 8 as a unit, obviously, facilitates the cleaning operation. After re-sealing of this unit to the reactor, a fresh bed of zircon sand or the like may be introduced by means of an auxiliary inlet (not shown) located at some suitable point in the reactor, in order to establish the original operating conditions.

Figure 4:
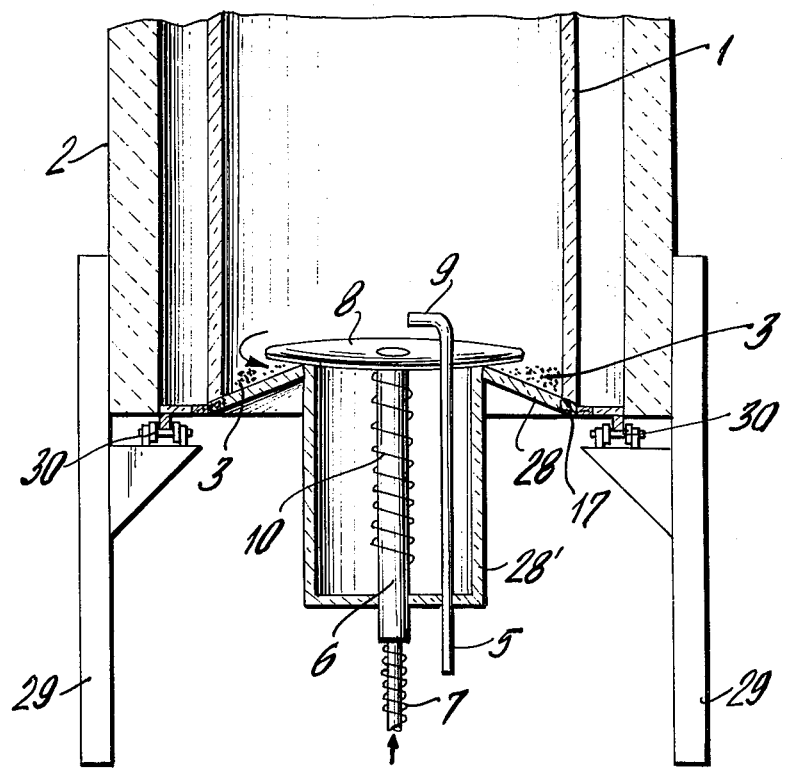
FIG. 4 shows a partial perspective view of still another embodiment of the invention, wherein the bottom of the reactor may be removed directly for cleaning.

Referring now to FIG. 4 of the drawings, there is illustrated a variance to the bottom of reactor of FIG. 1. The concentrates feed inlet 6 and oxidizing gas inlet 5 are as in FIG. 1. However, the concentrates-supporting vessel 8 is considerably larger and the bottom 28 of the reactor is sloping outwardly so as to provide a collection region for the ashy residue 3. Suitable seals are provided at 17 to prevent gas leaks. The bottom plate 28, together with the entire assembly 28' containing inlets 5 and 6, may be lowered to remove the residue material 3. As explained hereabove, using a satellite assembly as that of FIG. 2, such removal may be rendered necessary only once in a fortnight or so with vessels 8 of a 2-foot diameter. To facilitate the removal of the residue, the reactor is preferably on supporting legs 29 and the lowering mechanism 30 is attached to each leg consisting of conventional devices well known to the person skilled in the art. The concentrates-supporting vessel 8 may be caused to rotate by means of conventional mechanism (not shown), as indicated by the arrow, in order to facilitate the falling off of the ashy residue and the exposure of fresh concentrates to the action of the oxidizing stream.

Figure 5:
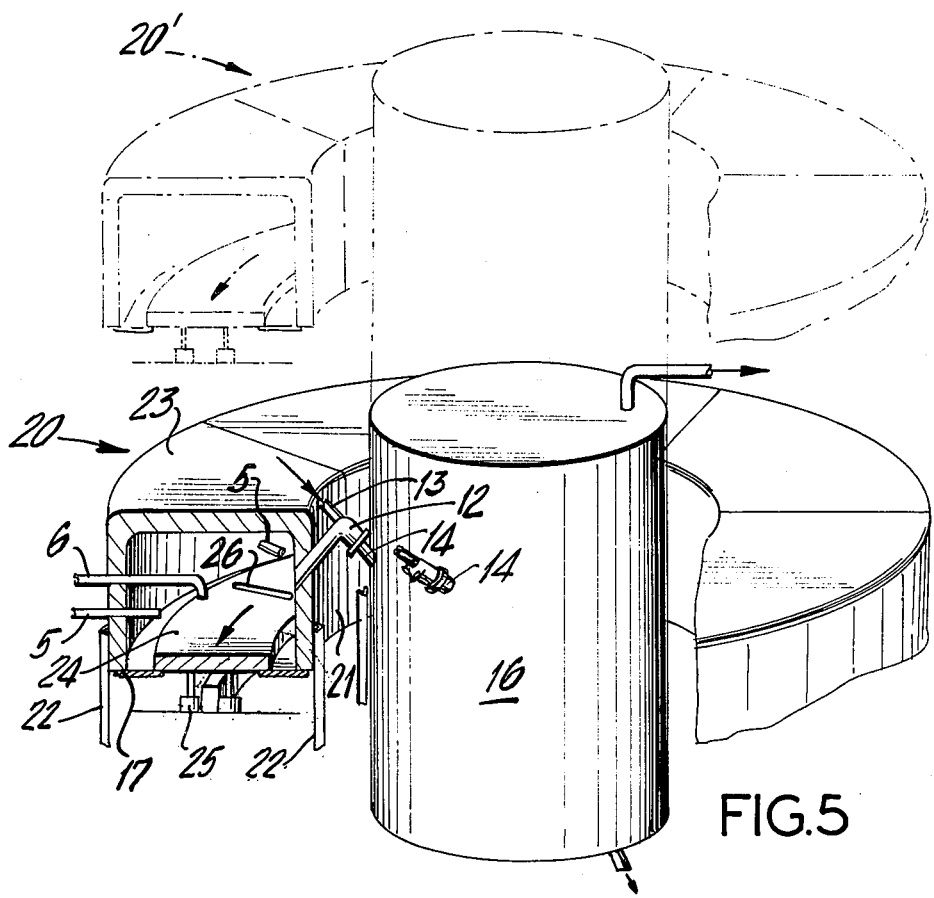
FIG. 5 shows a perspective, partly cut-away illustration of another annularly shaped embodiment of the invention.

Turning now to FIG. 5 of the drawings, another embodiment is illustrated, which utilizes the same principle delineated hereabove. The collecting unit 16 is again the central member of the apparatus and is provided with outlets for the gaseous and condensed products of the sublimation process. However, the satellite distribution of a plurality of individual reactors is, in this case, replaced by a doughnut-shaped annular chamber 20. This chamber is composed of a stationary member 21 which is arcuate and may be supported by conventional supporting means 22 above ground level. A cover or lid 23 is applied, suitably in sections, over the member 21, although this cover may, if so desired, be an integral part of the chamber. The cover 23 is preferably removable, section by section, for the purpose of facilitating inspection and repairs within the chamber proper. Obviously, the cover 23 is provided with sealing means to ensure prevention of heat-and gas losses. The chamber is, furthermore, made of heat-insulating material such as sic bricks or the like. Inside the chamber 20 there is located an annular moving platform 24 which revolves around the collector 16 by means of conventional underlying rails, guides and driving means, indicated generally at 25. This driving mechanism is more clearly described for example in co-pending application Ser. No. 226819 filed on Feb. 16, 1972 by Applicant and now abandoned. However, this mechanism is not claimed to be per se novel and is claimed only in combination with the entire apparatus. Suitable seals are provided at 17 to prevent gas leaks. At one point along the outer periphery of the annular chamber 20, there are provided suitable concentrates feed inlet 6 and oxidizing agent inlet 5 in a manner similar to that described with respect to FIG. 3 hereabove. Similarly, along the inner periphery of the annular chamber 20, there is provided a discharge outlet 14 for the sublimation products, which are directly introduced into the collector 16. The coolant is introduced, similarly to the previously described embodiments, via conduit 13. The removal of the non-sublimable material is effected, however, in this embodiment of the invention, in a different manner. The ashy residue is removed by providing at one point, adjacent to, but down-stream from the concentrates inlet 6 a discharge port 26. Suitably, baffles may be located directly upstream from the discharge port, so as to convey the residue thereto. These baffles (not shown) are conventional and well known to the person skilled in the art. For example, see U.S. Pat. No. 3,667,746 where such a baffle is utilized to remove the product from an annular hearth. They may be rendered intermittently operative, that is, they may be movably attached to the chamber member 21 and lowered onto the moving platform 24 when required, in which case it can be readily seen that much of the material on the platform 24 may be allowed to effect more than one revolution around the collection unit 16. Or, in the alternate and preferred situation, the baffles may be located stationary just above the upper surface of the platform 24 so as to be continuously operative. While it is preferred to have a single feed inlet 6 for the concentrates, it is possible to utilize a plurality of inlets 5 for the oxidizing agent, distributed along the annular outer periphery of the chamber, and a plurality of gas discharges 14 along the inner periphery of the chamber, so as to ensure the sublimation of all of the material fed to the reactor and to facilitate the recovery of the products.

If so desired, and in order to increase the volume of material handled, it is possible to have a plurality of chambers, superimposed on one another about the central collecting unit 16. One typical example is shown in FIG. 5 in phantom lines, where a second chamber 20' is outlined above the base chamber 20. It goes without saying that the two chambers are identical to each other and that the central collector 16 need only be larger in volume.

Heating means for the embodiment of FIG. 5 are provided internally of the chamber 20 and may be either composed of a plurality of heating coils fixedly attached to the walls of the chamber or to the cover thereof. These means, being conventional in the art, are not described in detail, nor illustrated.

What is claimed is:

1. Apparatus for the sublimation of sublimable ore concentrates which comprises:
   a. at least one corrosion-resistant, heat-resistant reaction chamber having a substantially rectilinear lower section and a curved upper section;
   b. a corrosion-resistant, heat resistant vessel in said lower section for carrying sublimable ore concentrates in said reaction chamber, said vessel terminating into a substantially cup-shaped configuration;
   c. means for feeding the ore concentrates to said cup-shaped vessel;
   d. means for continuously introducing an oxidizing gaseous stream to a region in the reaction chamber proximate said cup-shaped vessel;
   e. heating means surrounding at least said rectilinear lower section of said reaction chamber, externally thereto, to obtain oxidation-sublimation conditions within said reaction chamber;
   f. means for introducing into said upper section a coolant medium for condensing the condensable constituent products of the oxidation-sublimation reaction;
   g. means for withdrawing from the rectilinear section of the reaction chamber those constituents of the feed which are not sublimable; and
   h. means for collecting and separating the products of the reaction.

2. The apparatus of claim 1, further including auxiliary heating means surrounding said ore feed inlet, externally thereto, to preheat said feed prior to contact with said oxidizing gaseous stream.

3. The apparatus of claim 1, wherein a plurality of said reaction chambers is positioned peripherically around said means for collecting and separating the products of the reaction.

4. The apparatus of claim 1, wherein said cup-shaped vessel has a hollow supporting stem containing therewithin said concentrates feeding means and protruding from said lower section of the reactor.

5. The apparatus of claim 1, wherein said cup-shaped vessel is integrally welded to said lower section of the reactor at the inner bottom surface thereof, said bottom surface being removably sealed to said reactor.

6. The apparatus of claim 1, wherein said cup-shaped vessel is rotatably mounted within said reactor to facilitate the falling off of non-sublimable residue therefrom.

7. The apparatus of claim 1, wherein the said lower section comprises a bottom plate sealed peripherically thereto, said bottom plate having an outwardly downwardly sloping inner surface for collection of non-sublimable reside material, said bottom plate being removable from said lower section.

8. Apparatus for the sublimation of sublimable ore concentrates, which comprises:
   a. a central vessel for collecting and separating the products of sublimation and provided with outlets for the removal of said products;
   b. at least one corrosion-resistant, heat-resistant reaction chamber having substantially annular shape and surrounding said central vessel, said chamber being supported by supporting means and being positioned at a distance above ground level;
   c. a moving platform within said chamber for movement of the ore concentrates around said central vessel, said platform being provided with sealing means at points of contact with said chamber and being guided by rail-guiding means positioned underneath said platform;
   d. inlet for continuously introducing the ore concentrates onto said platform;
   e. at least one inlet for continuously introducing an oxidizing gaseous stream to a region in said chamber proximate said ore concentrates-carrying platform;
   f. at least one outlet section for continuously withdrawing from said chamber to said central vessel the products of sublimation;
   g. heating means surrounding said chamber, internally thereto, to obtain oxidation-sublimation conditions within said reaction chamber;
   h. means for introducing into said outlet section a coolant medium for condensing the condensable constituents of the sublimation reaction; and
   i. means for withdrawing from said chamber those constituents of the concentrates feed which are not sublimable.

9. The apparatus of cliam 8, wherein a plurality of oxidizing gaseous stream inlets is located peripherically in said chamber.

10. The apparatus of claim 8, wherein a plurality of outlet sections is located peripherically in said chamber, connecting said chamber with said central vessel.

11. The apparatus of claim 8, wherein said reaction chamber comprises a detachable and sectionalized cover, removable from the walls of the said chamber for ease of inspection of the inside of said chamber.

* * * * *